UNITED STATES PATENT OFFICE.

EDWARD S. CHAPIN, OF SHARON, AND EMIL LESSER, OF BOSTON, MASSACHUSETTS, ASSIGNORS TO AMERICAN DYEWOOD COMPANY, OF NEW YORK, N. Y., A CORPORATION OF PENNSYLVANIA.

DYESTUFFS AND PROCESS OF MANUFACTURING THE SAME.

1,106,781.     Specification of Letters Patent.     Patented Aug. 11, 1914.

No Drawing.     Application filed December 20, 1910. Serial No. 598,363.

*To all whom it may concern:*

Be it known that we, EDWARD S. CHAPIN, a citizen of the United States, and a resident of Sharon, Norfolk county, Massachusetts, and EMIL LESSER, a citizen of the United States, and a resident of Boston, Suffolk county, Massachusetts, have invented certain new and useful Improvements in Dyestuffs and Processes of Manufacturing the Same, of which the following is a specification.

Our invention relates to certain new azo dyestuffs, and to the process of producing the same by coupling diazotized amido sulfonic acids with alpha-anhydro-tetramethyl-hematoxylone. This last named substance was first prepared by Herzig (*Monatsh.* 1895, 16, 909–910) by oxidizing acetyl-methyl-hematoxylin with chromic acid in acetic acid solution. It may be made in the manner discovered by W. H. Perkin, (*Trans.* 1902: 81:1008–1066).

We have discovered that certain diazotized amido-sulfonic acids when coupled with alpha-anhydro-tetra-methyl-hematoxylone will form azo dyestuffs. We have thus coupled the diazo compounds of amido-benzene-sulfonic acids, as, for instance, para-amido-benzene-sulfonic acid and amido-azo-benzene-disulfonic acid; also amido-naphthalene-sulfonic acids, for instance: 1.4-naphthylamin-sulfonic acid, 1.5-naphthylamin-sulfonic acid, a mixture of 1.6- and 1.7-naphthylamin-sulfonic acid, 1.3.6.8-amido-oxy-di-sulfonic acid, 2.6-naphthylamin-sulfonic acid, and 2.6.8-beta-naphthylamin-di-sulfonic acid; and have obtained satisfactory results. These products are all characterized by the fact that they are soluble in water and will color animal fiber in an acid bath; that they are all soluble in hydrochloric acid, nitric acid, caustic soda, and water, although in some cases only sparingly; that in nitric acid all dissolve with a brown or brownish color, and in caustic soda on dilution with water with a color containing some shade of red. Silk is dyed by them more readily than wool. When silk and wool are together introduced into the acidified dyebath of the color, the silk is more heavily dyed than the wool.

These dyestuffs give colors of various shades, for instance: Amido-azo-benzene-disulfonic acid will give a dark red, violet tone; a mixture of 1.6- and 1.7-amido-naphthalin-sulfonic acid, Cleves acid, dark red to black brown; 1.5-naphthylamin-sulfonic acid, L acid, dark red; 1.3.6.8-amido-oxy-disulfonic acid, H acid, black violet; 2.6-naphthylamin-sulfonic acid, Brönner's acid, dark red; 2.6.8-B-naphthylamin-di-sulfonate, potassium salt, amido G salt, rich purplish red.

The following examples will serve to illustrate the manner in which azo dyestuffs may be produced by our process:

*Example I. Color made by combining diazotized para-amido-benzene-sulfonic acid and alpha-anhydro-tetra-methyl-hematoxylone.*—5.8 gr. para-amido-benzene-sulfonic acid (sulfanilic acid) (previously dried at 100°) was dissolved with an addition of 5. cc. NaHO 24% in 200. cc. cold water. To this solution were added 10. cc. HCl. 1.2 sp. gr. and the clear liquor diazotized with 2.4 gr. NaNO$_2$ dissolved in 25 cc. water. The whole was kept cool by ice at a temperature of 4° and after the addition of all NaNO$_2$ left for 10 min., when a test with iodid starch paper showed a slight coloration. On the other hand 13.7 gr. alpha-anhydro-tetra-methyl-hematoxylone, 20. cc. NaHO 24% and 200. cc. water were mixed to a thin paste in the stirring apparatus. To this paste was added in a slow continuous stream with constant stirring the diazotized compound. The whole kept its alkalinity throughout the 1½ hours stirring, after which time 125. cc. HCl 1.2 sp. gr. were added and the stirring continued for 10 min. The pasty liquor was then filtered on the pump, the color-precipitate dried on the waterbath and ground up.

The color formed from sulfanilic acid and alpha-anhydro-tetra-methyl-hematoxylone is a greenish black powder. It dissolves in water and alcohol to a deep red solution; is soluble in concentrated sulfuric acid to a dark greenish blue solution, turning red on dilution with water, dissolves sparingly in concentrated hydrochloric acid; dissolves in concentrated nitric acid to a dark brown color; and is soluble in 5 and 10% solutions of caustic soda to a dark red color.

*Example II. Color made by combining diazotized 1.4-naphthylamin-sulfonic acid with alpha-anhydro-tetra-methyl-hematoxylone.*—10.6 gr. sodium naphthionate were dissolved in 250. cc. cold water and after adding 8.4 cc. HCl. 1.2 sp. gr., the whole cooled down to 5° and diazotized with 2.4 gr. $NaNO_2$ dissolved in 25 cc. water. The whole was left cold (at 10°) for 1 hour, after which time nitrous acid could be still detected, although very faintly, with iodid starch paper. A yellow thin paste was thus formed and added to the second compound in the stirring machine. This compound was made up by making to a thin paste 13.7 gr. alpha-anhydro-tetra-methyl-hematoxylone with 200. cc. water and 20. cc. NaOH 24%. The whole was stirred for 1½ hours, during which time it kept its alkalinity. The liquor was then acidified with HCl. 1.2 sp. gr. in the proportion of about 15-20 cc. HCl. for each 100 cc. of liquor, stirred for 5 minutes and left to settle. The coloring matter settled as a fine dark-red precipitate, which could be easily filtered on a pump into a cake; the filtered liquor was perfectly clear.

The color formed from 1.4-naphthylamin-sulfonic acid and alpha-anhydro-tetra-methyl-hematoxylone is a dark brown powder. It dissolves in water and alcohol yielding bluish red solutions; is soluble in concentrated sulfuric acid to a deep blue solution, turning red on the addition of water; in concentrated nitric acid it is soluble to a dark brown color; in concentrated hydrochloric acid it dissolves sparingly; and in a five or ten per cent. solution of caustic soda it is soluble to a brownish color.

We have found that similar results may be obtained by substituting for the alpha-anhydro-tetra-methyl-hematoxlyone its beta-isomer, but that the reactions do not proceed as smoothly. These isomers must be regarded as chemical equivalents.

We desire to have it understood that when we refer in our claims to the product or products obtainable by the method hereinbefore described, we intend to claim the product or products broadly, no matter by what process they may be produced, provided that they possess the following characteristics: Either that they may be made by any process, and are soluble in hydrochloric acid, nitric acid, caustic soda, and water, although in some cases only sparingly, and will dissolve in nitric acid with a brownish color, and in caustic soda on dilution with water with a color containing some shade of red, or that they actually have been made by our process.

We claim:

1. The process of making an azo dyestuff which consists in coupling a diazotized amido-sulfonic acid with an anhydro-tetra-methyl-hematoxylone.

2. The process of making an azo dyestuff which consists in coupling a diazotized amido-sulfonic acid with an alpha-anhydro-tetra-methyl-hematoxylone.

3. The process of making an azo dyestuff which consists in coupling a diazotized amido-naphthalene-sulfonic acid with an anhydro-tetra-methyl-hematoxylone.

4. The process of making an azo dyestuff which consists in coupling a diazotized amido-naphthalene-sulfonic acid with an alpha-anhydro-tetra-methyl-hematoxylone.

5. The process of making an azo dyestuff which consists in coupling diazotized alpha-naphthylamin-sulfonic acid-1.4 with an anhydro-tetra-methyl-hematoxlyone.

6. The process of making an azo dyestuff which consists in coupling diazotized alpha-naphthylamin-sulfonic acid-1.4 with alpha-anhydro-tetra-methyl-hematoxylone.

7. The new azo dyestuffs which can be obtained by coupling a diazotized amido-sulfonic-acid with alpha-anhydro-tetra-methyl-hematoxylone and characterized by the fact that they are soluble in water and will color animal fiber in an acid bath; that they are all soluble in hydrochloric acid, nitric acid, caustic soda, and water, although in some cases only sparingly; that in nitric acid all dissolve with a brown or brownish color, and in caustic soda on dilution with water with a color containing some shade of red, and that silk is dyed by them more readily than wool.

8. The new azo dyestuffs which can be obtained by coupling a diazotized amido-naphthalene-sulfonic acid with alpha-anhydro-tetra-methyl-hematoxylone and characterized by the fact that they are soluble in water and will color animal fiber in an acid bath; that they are all soluble in hydrochloric acid, nitric acid, caustic soda, and water, although in some cases only sparingly; that in nitric acid all dissolve with a brown or brownish color, and in caustic soda on dilution with water with a color containing some shade of red, and that silk is dyed by them more readily than wool.

9. The new azo dyestuff which can be obtained by coupling diazotized 1.4-naphthyl-amin-sulfonic acid with alpha-anhydro-tetra-methyl-hematoxylone, and may be recognized by the following characteristics: It is dark brown in color, dissolves in water and alcohol yielding bluish red solutions; is soluble in concentrated sulfuric acid to a deep blue solution, turning red on the addition of water; in concentrated nitric acid it dissolves to a dark brown color; in concentrated hydrochloric acid it dissolves sparingly; and in five and ten per cent. solutions of caustic soda it is soluble to a brownish red color.

In witness whereof we have hereunto set our hands in the presence of two subscribing witnesses.

EDWARD S. CHAPIN.
EMIL LESSER.

Witnesses:
  SAMUEL P. MULLIKEN,
  ELIZABETH C. SAUL.